United States Patent
Hoshino et al.

(10) Patent No.: US 7,844,013 B2
(45) Date of Patent: Nov. 30, 2010

(54) TRANSMITTING APPARATUS, RECEIVING APPARATUS, AND LINK ADAPTATION METHOD

(75) Inventors: Masayuki Hoshino, Kanagawa (JP); Ryohei Kimura, Kanagawa (JP); Yasuaki Yuda, Kanagawa (JP); Tomohiro Imai, Kanagawa (JP); Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 11/912,630

(22) PCT Filed: Apr. 24, 2006

(86) PCT No.: PCT/JP2006/308571

§ 371 (c)(1),
(2), (4) Date: Oct. 25, 2007

(87) PCT Pub. No.: WO2006/118081

PCT Pub. Date: Nov. 9, 2006

(65) Prior Publication Data

US 2009/0034637 A1    Feb. 5, 2009

(30) Foreign Application Priority Data

Apr. 26, 2005   (JP)   .................. 2005-127719

(51) Int. Cl.
*H04L 27/00* (2006.01)

(52) U.S. Cl. .................. 375/295; 375/141; 375/146; 375/219; 375/259; 375/267

(58) Field of Classification Search ............... 375/295, 375/267, 141, 146, 219

See application file for complete search history.

(56) References Cited

U.S. PATENT DOCUMENTS

| 6,393,047 B1 * | 5/2002 | Popovic' | .................. 375/140 |
| 6,892,175 B1 * | 5/2005 | Cheng et al. | ................. 704/205 |
| 7,656,913 B2 * | 2/2010 | Nakai | .......................... 372/25 |

FOREIGN PATENT DOCUMENTS

| JP | 2002217752 | 8/2002 |
| JP | 2004040232 | 2/2004 |
| JP | 2004194262 | 7/2004 |

* cited by examiner

*Primary Examiner*—Ted M Wang
(74) *Attorney, Agent, or Firm*—Dickinson Wright PLLC

(57) ABSTRACT

A link adaptation method and others wherein feedback information amount can be reduced. According to this method, a receiving apparatus (100) calculates, based on a channel matrix, a capacity (C) and a stream ratio (r) that is a ratio of the reception qualities of streams, and then transmits, as feedback information, the calculated capacity (C) and stream ratio (r) to a transmitting apparatus. In the transmitting apparatus (200), the number of transmittable streams, the modulation scheme and the fed-back capacity (C) are used to calculate the encoding ratio (R) and sequence length (S) of spatial multiplexed symbols. Then, the modulation scheme (M1-Mn) of each stream is decided based on the fed-back stream ratio (r) and the sequence length (S) of spatial multiplexed symbols.

9 Claims, 9 Drawing Sheets

TRANSMITTING APPARATUS, RECEIVING APPARATUS, AND LINK ADAPTATION METHOD

TECHNICAL FIELD

The present invention relates to a transmitting apparatus, receiving apparatus and link adaptation method used in a wireless communication system using a MIMO (Multiple Input Multiple Output) technique which receives radio signals transmitted from a plurality of antenna elements through a plurality of antenna elements and carries out wireless communication.

BACKGROUND ART

MIMO is known as a technique which provides a plurality of antennas on both the transmitting side and the receiving side, provides a plurality of radio wave channels in a space between radio transmission and reception and transmits a signal by spatially multiplexing the channels. It is possible to improve the transmission efficiency by using MIMO.

A link adaptation technique is one of peripheral element techniques of MIMO. Link adaptation is a technique of adaptively controlling an M-ary number (transmission rate) of modulation scheme, coding rate, transmission power distribution, or the like according to fluctuation of channel environments between transmission and reception. When link adaptation is applied to MIMO and encoding is performed in stream (transmitting antenna or beam to which data is allocated) units, MIMO channels can be effectively used. As such a technique, a technique disclosed in Patent Document 1 is known.

FIG. 1 is a block diagram showing the configuration of a MIMO system disclosed in Patent Document 1. This MIMO system assumes a system which performs encoding and transmission power control after dividing a signal into streams, and channel estimator 21 of receiver 20 performs channel estimation, and power/rate calculator 22 determines rates and power of the streams using the channel estimation values. Receiver 20 feeds back indicators indicating the rates and the power determined by power/rate calculator 22 to transmitter 10. Transmitter 10 refers to the indicators fed back from receiver 20 and derives rates and power to be applied to the streams. In this way, it is possible to set transmission rates and transmission power according to channel conditions of the streams and realize high-speed transmission with secured reliability.

Patent Document 1: Japanese Patent Application Laid-Open No. 2002-217752

DISCLOSURE OF INVENTION

Problems to be Solved by the Invention

Generally, it is possible to obtain space diversity effect by applying coding over a plurality of streams. However, the technique disclosed in Patent Document 1 involves a large amount of information of indicators to be fed back, which puts pressure on communication capacities.

It is therefore an object of the present invention to provide a transmitting apparatus, receiving apparatus and link adaptation method that make it possible to reduce the amount of feedback information.

Means for Solving the Problem

The transmitting apparatus of the present invention adopts a configuration including: a transmitting apparatus comprising a management section that manages a number of transmittable streams and modulation schemes; a reception section that receives feedback information indicating a communication capacity of a channel, ratios or ranks of reception quality of the streams; and a transmission parameter determining section that determines a sequence length of spatially multiplexed symbols and a coding rate based on the communication capacity of the channel received by the reception section, the number of transmittable streams and modulation schemes managed by the management section and determines the modulation schemes of the streams based on the sequence length of the spatially multiplexed symbol and the ratios or ranks of the reception quality of the streams. Here, the "sequence length of spatially multiplexed symbols" refers to the number of bits in a symbol spatially multiplexed and transmitted in a MIMO configuration.

The receiving apparatus of the present invention adopts a configuration including: a receiving apparatus comprising a channel estimation section that performs channel estimation using a common reference signal; a communication capacity calculation section that calculates a communication capacity of the channel using a channel estimation value estimated by the channel estimation section a stream ratio calculation section that calculates ratios or ranks of reception quality of streams using the channel estimation value estimated by the channel estimation section; and a feedback section that feeds back the communication capacity calculated by the communication capacity calculation section and the ratios or ranks of the reception quality of the streams calculated by the stream ratio calculation section as feedback information.

The link adaptation method of the present invention includes the steps of: acquiring feedback information indicating a communication capacity of a channel and ratios or ranks of reception quality of streams; determining a sequence length of spatially multiplexed symbols and a coding rate based on the acquired communication capacity of the channel, a number of transmittable streams and modulation schemes; and determining the modulation schemes of the streams based on the sequence length of the spatially multiplexed symbol and the acquired ratios or ranks of the reception quality of the streams.

The radio communication system of the present invention adopts a configuration including: a transmitting apparatus that includes: a management section that manages a number of transmittable streams and modulation schemes; a transmission parameter determining section that determines a sequence length of spatially multiplexed symbols and a coding rate based on a communication capacity of a channel, the number of transmittable streams and modulation schemes managed by the management section and determines the modulation schemes of the streams based on the sequence length of the spatially multiplexed symbol, ratios or ranks of reception quality of the streams; and a transmission section that transmits data processed using the coding rate and modulation scheme determined by the transmission parameter determining section; and a receiving apparatus that includes: a feedback section that feeds back the communication capacity of the channel and the ratios or ranks of the reception quality of the streams to the transmitting apparatus as feedback information; and a reception section that receives the data transmitted from the transmitting apparatus.

Advantageous Effect of the Invention

According to the present invention, the amount of feedback information can be reduced.

BEST MODE FOR CARRYING OUT THE INVENTION

Figure 1:
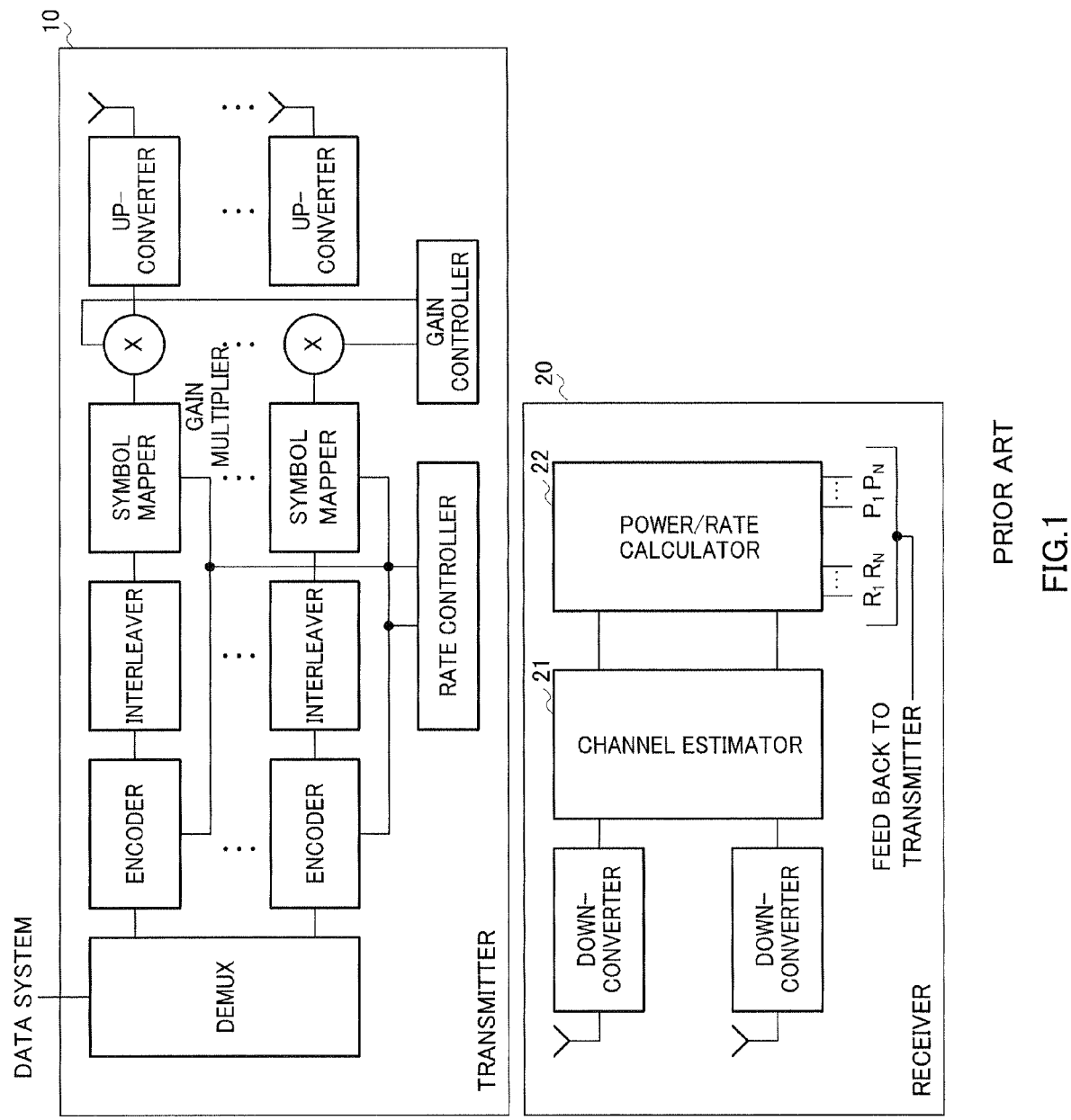
FIG. 1 is a block diagram showing the configuration of the MIMO system disclosed in Patent Document 1.

Embodiments of the present invention will be described below in detail with reference to the accompanying drawings. However, components having the same functions in the embodiments will be assigned the same reference numerals, and overlapping explanations will be omitted.

Embodiment 1

Figure 2:
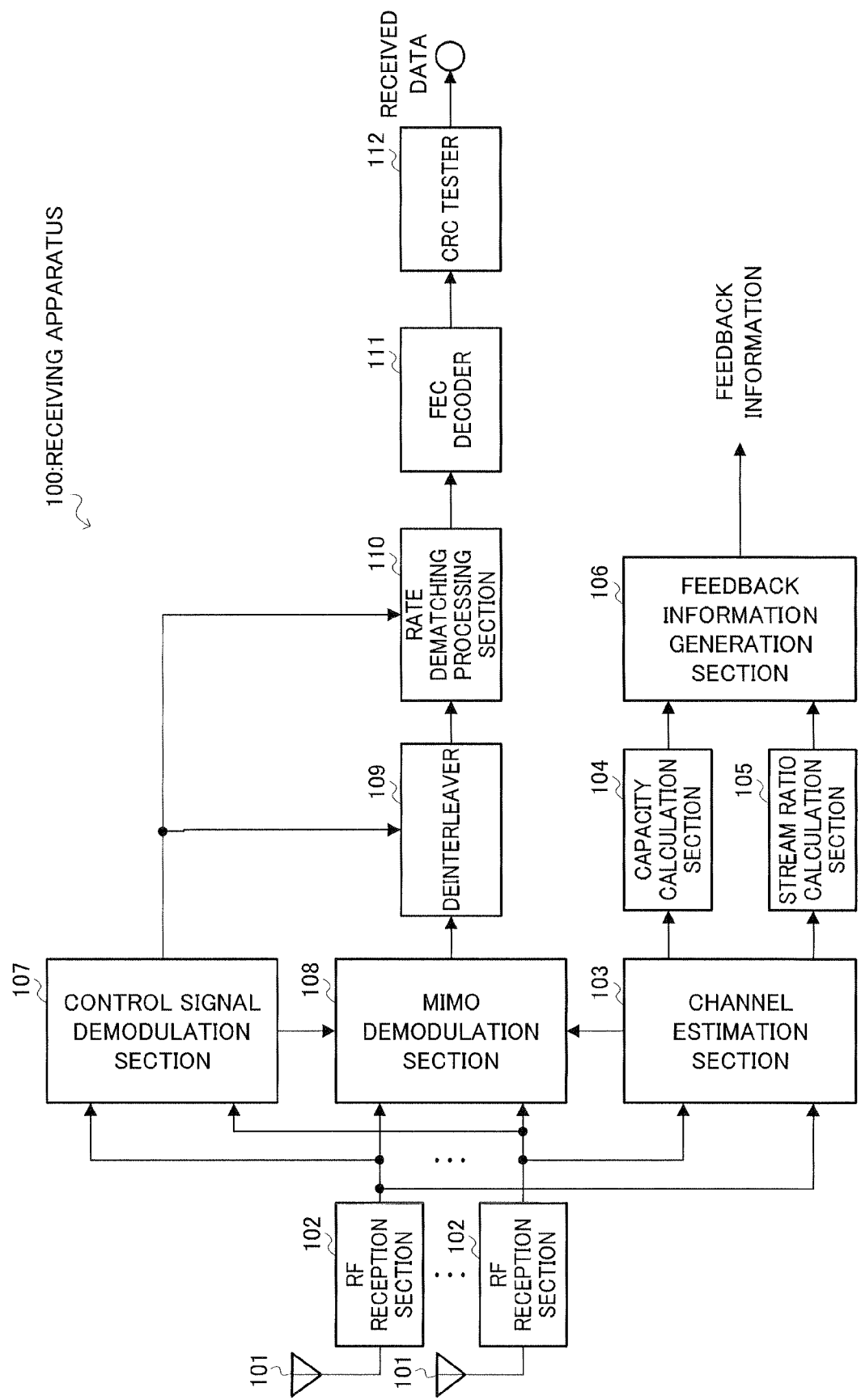
FIG. 2 is a block diagram showing the configuration of a receiving apparatus according to Embodiment 1 of the present invention.

FIG. 2 is a block diagram showing the configuration of receiving apparatus 100 according to Embodiment 1 of the present invention. In this figure, RF reception section 102 converts a carrier signal of a radio frequency band received from a transmitting apparatus through antenna 101 to a baseband signal and outputs the converted baseband signal to channel estimation section 103, control signal demodulation section 107 and MIMO demodulation section 108.

Channel estimation section 103 demodulates a common reference signal from the baseband signal outputted from RF reception section 102, calculates channel estimation values (channel matrix) about all combinations of transmitting antennas and receiving antennas using the demodulated common reference signal and outputs the calculated channel estimation values to capacity calculation section 104, stream ratio calculation section 105 and MIMO demodulation section 108.

Capacity calculation section 104 calculates capacity (communication capacity) C using a determinant of the channel matrix outputted from channel estimation section 103 and outputs calculated capacity C to feedback information generation section 106.

Based on the channel matrix outputted from channel estimation section 103, stream ratio calculation section 105 calculates ratio r of reception quality (SINR: Signal to Interference and Noise Ratio) between streams and outputs calculated stream ratio r to feedback information generation section 106.

Feedback information generation section 106 generates feedback information indicating capacity C outputted from capacity calculation section 104 and stream ratio r outputted from stream ratio calculation section 105 and transmits the generated feedback information to the transmitting apparatus.

Control signal demodulation section 107 demodulates modulation information, MIMO multiplexing information and coding information from the baseband signal outputted from RF reception section 102 and outputs the demodulated modulation information and MIMO multiplexing information to MIMO demodulation section 108 and outputs the coding information to deinterleaver 109 and rate dematching processing section 110.

MIMO demodulation section 108 carries out MIMO demodulation on the baseband signal outputted from RF reception section 102 using the channel matrix outputted from channel estimation section 103, the modulation information and the MIMO multiplexing information outputted from control signal demodulation section 107 and outputs the demodulation result of a soft decision value to deinterleaver 109.

Deinterleaver 109 deinterleaves the soft decision value outputted from MIMO demodulation section 108 based on the coding information outputted from control signal demodulation section 107. The deinterleaved signal is subjected to rate dematching processing by rate dematching processing section 110 based on the coding information outputted from control signal demodulation section 107.

FEC decoder 111 carries out FEC decoding on the signal after the rate dematching processing, and then CRC tester 112 conducts CRC check. When it is confirmed that there is no error in the check result, the received data is extracted.

Figure 3:
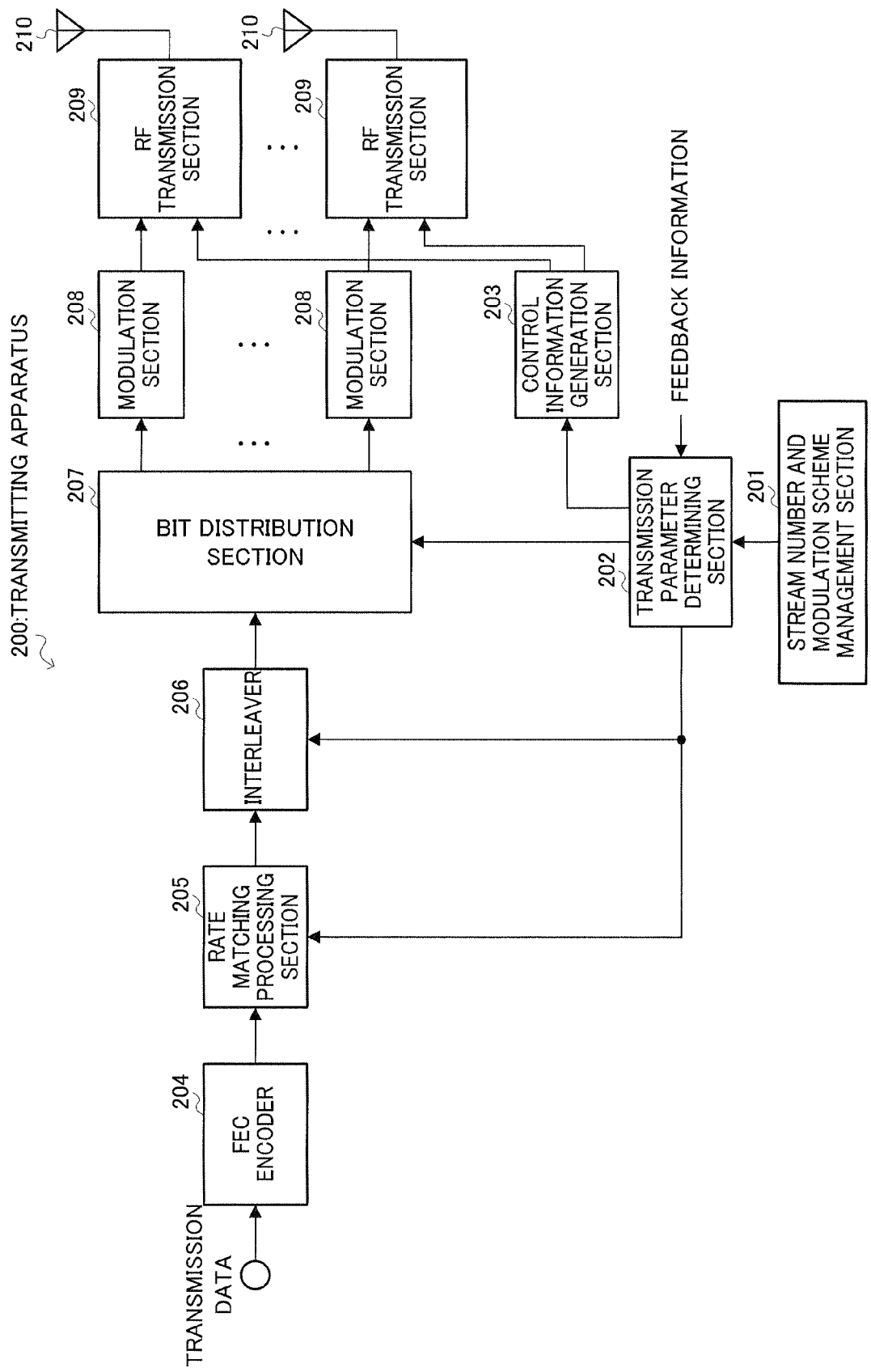
FIG. 3 is a block diagram showing the configuration of a transmitting apparatus according to Embodiment 1 of the present invention.

FIG. 3 is a block diagram showing the configuration of transmitting apparatus 200 according to Embodiment 1 of the present invention. In this figure, stream number and modulation scheme management section 201 manages the number of streams that can be transmitted by transmitting apparatus 200 and modulation schemes and reports the number of transmittable streams and modulation schemes to transmission parameter determining section 202.

Transmission parameter determining section 202 sets coding rate R using capacity C out of the feedback information transmitted from receiving apparatus 100 and outputs set coding rate R (coding information) to rate matching processing section 205 and interleaver 206. Furthermore, transmission parameter determining section 202 determines modulation schemes M1 to Mn of streams using stream ratio r out of the feedback information and outputs determined modulation schemes M1 to Mn (modulation scheme information) and the MIMO multiplexing information to bit distribution section 207. Moreover, transmission parameter determining section 202 outputs the above modulation scheme information, coding information and MIMO multiplexing information to control information generation section 203. Processing by transmission parameter determining section 202 will be described in detail later.

Control information generation section 203 generates control information by applying predetermined processing to the modulation scheme information, coding information and MIMO multiplexing information outputted from transmission parameter determining section 202 and outputs the generated control information to RF transmission section 209.

FEC encoder 204 applies FEC coding to the transmission data based on a predetermined coding scheme and outputs the FEC coded transmission data to rate matching processing section 205. Rate matching processing section 205 performs rate matching processing on the transmission data outputted from FEC encoder 204 so as to match coding rate R outputted from transmission parameter determining section 202. Based on the coding information outputted from transmission parameter determining section 202, the transmission data subjected to the rate matching processing is rearranged by interleaver 206 according to a predetermined bit pattern and outputted to bit distribution section 207.

Bit distribution section 207 distributes the bit sequence outputted from interleaver 206 to streams based on the modulation information and MIMO multiplexing information outputted from transmission parameter determining section 202.

Modulation section 208 generates a modulated symbol of each stream from the bit sequence outputted from bit distribution section 207. RF transmission section 209 upconverts the generated modulated symbol to a carrier signal of a radio frequency band and transmits the signal through each antenna 210.

Figure 4:
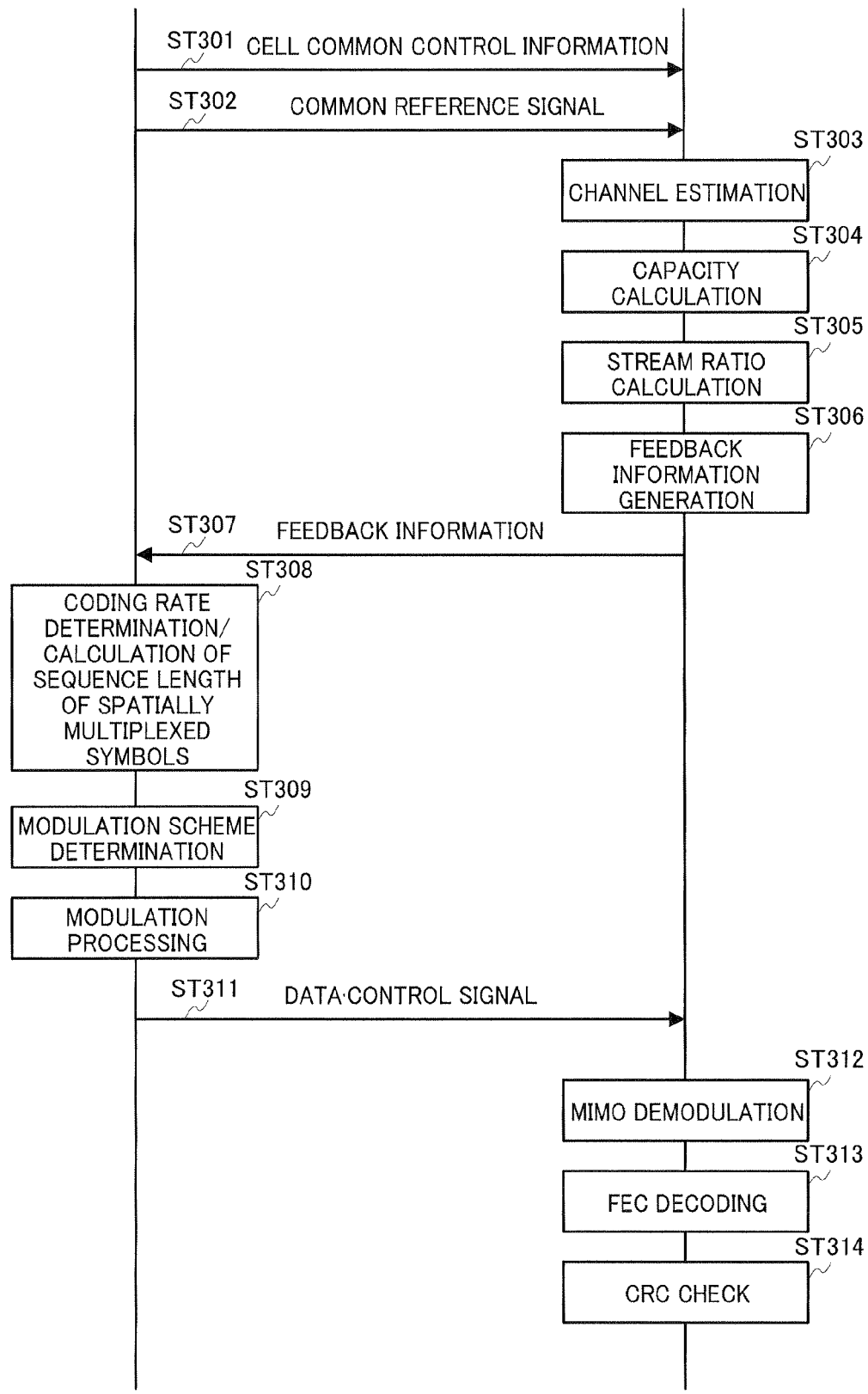
FIG. 4 is a sequence diagram showing the operations of the receiving apparatus shown in FIG. 2 and the transmitting apparatus shown in FIG. 3.

Next, the operations of above-described receiving apparatus 100 and transmitting apparatus 200 will be described using FIG. 4. In FIG. 4, transmitting apparatus 200 transmits cell common control information to receiving apparatus 100 in step (hereinafter "ST") 301, and transmitting apparatus 200 also transmits a common reference signal to receiving apparatus 100 in ST302.

In ST303, based on the common reference signal transmitted from transmitting apparatus 200, channel estimation section 103 of receiving apparatus 100 performs channel estimation and obtains a channel matrix.

In ST304, capacity calculation section 104 calculates capacity C as x.y [bps/Hz] using a determinant of the channel matrix. Furthermore, in ST305, stream ratio calculation section 105 calculates ratio r of reception quality (SINR) of each stream based on the channel matrix.

In ST306, feedback information generation section 106 generates feedback information that indicates capacity C calculated in ST304 and stream ratio r calculated in ST305 and, in ST307, transmits the feedback information generated in ST306 to transmitting apparatus 200.

In ST308, transmission parameter determining section 202 of transmitting apparatus 200 calculates sequence length S of spatially multiplexed symbols (the number of bits in symbols transmitted by being spatially multiplexed in a MIMO configuration, that is, the total amount of bits per symbol transmitted in the streams) out of the feedback information transmitted from receiving apparatus 100 and coding rate R.

This calculation method will be described in detail. Transmitting apparatus 200 manages the number of transmittable streams and modulation schemes and stores candidates $s_1$ to $s_j$ for the sequence length of spatially multiplexed symbols as a table by combining the number of transmittable streams and modulation schemes. Coding rate $R_{est\_i}$ for the case of assuming fed back capacity C can be estimated to be $R_{est\_i}=C/s_j$. Therefore, based on bit number candidates $s_1$ to $s_j$, the bit number candidate is selected so that $R_{est\_i}$ is the closest to ½. $R_{est\_i}$ is set as coding rate R taking the selected bit number candidate as sequence length S of the spatially multiplexed symbol.

In ST309, transmission parameter determining section 202 determines modulation schemes Ml to Mn of the streams based on stream ratio r and sequence length S of the spatially multiplexed symbol calculated in ST308 out of the feedback information transmitted from receiving apparatus 100. Furthermore, symbols of larger M-ary numbers are preferentially allocated to streams having better reception quality.

In ST310, the data obtained by applying FEC coding to the transmission data based on a predetermined coding scheme is subjected to rate matching processing at coding rate R calculated in ST308, and modulation section 208 performs modulation processing for each stream using the modulation scheme determined in ST309.

In ST311, the data subjected to the modulation processing in ST310 is transmitted to receiving apparatus 100, and a control signal including modulation information, MIMO multiplexing information and coding information is transmitted to receiving apparatus 100.

In ST312, MIMO demodulation section 108 of receiving apparatus 100 performs MIMO demodulation on data based on the control signal, in ST313, FEC decoder 111 performs FEC decoding on the MIMO-demodulated data, and, in ST314, CRC tester 112 performs a CRC check on the FEC-decoded data.

Here, the setting of a transmission pattern in ST308 and ST309 will be described using a specific example. It is assumed that feedback information capacity C=2.9 bps/Hz, and ratio of the second stream to the first stream r=1.5. At transmitting apparatus 200, it is assumed that the number of transmittable streams is two and the modulation schemes are 16QAM and QPSK.

In this case, the sequence length candidate of the spatially multiplexed symbol becomes eight bits when both of the two streams apply 16QAM, six bits when the two streams apply 16QAM and QPSK, and two bits when both of the two streams apply QPSK. When capacity C=2.9 is divided by the sequence length candidate of the spatially multiplexed symbol, R is approximately 0.48 and becomes the closest to ½ when the sequence length candidate of the spatially multiplexed symbol is set six bits. Therefore, coding rate R is determined to be 0.48, and the modulation schemes are determined to be 16QAM and QPSK. However, stream ratio r is 1.5, and the second stream has better quality than the first stream. Therefore, QPSK which has a smaller M-ary number is allocated to the first stream, and 16QAM which has a larger M-ary number is allocated to the second stream.

In this way, according to Embodiment 1, the transmitting apparatus can determine a coding rate and a modulation scheme of each stream using a capacity and a stream ratio. Therefore, by including a capacity and stream ratio into the feedback information from the receiving apparatus to the transmitting apparatus, the amount of feedback information can be reduced.

This embodiment has been described assuming that capacity C and stream ratio r are calculated based on the channel matrix and the calculated information is transmitted as feedback information. However, feedback information may also be acquired based on the cell common control information reported to the whole cell. Examples of the method of using cell common control information include a method of feeding back an index number in the table by reporting a predetermined table, for example.

Embodiment 2

Figure 5:
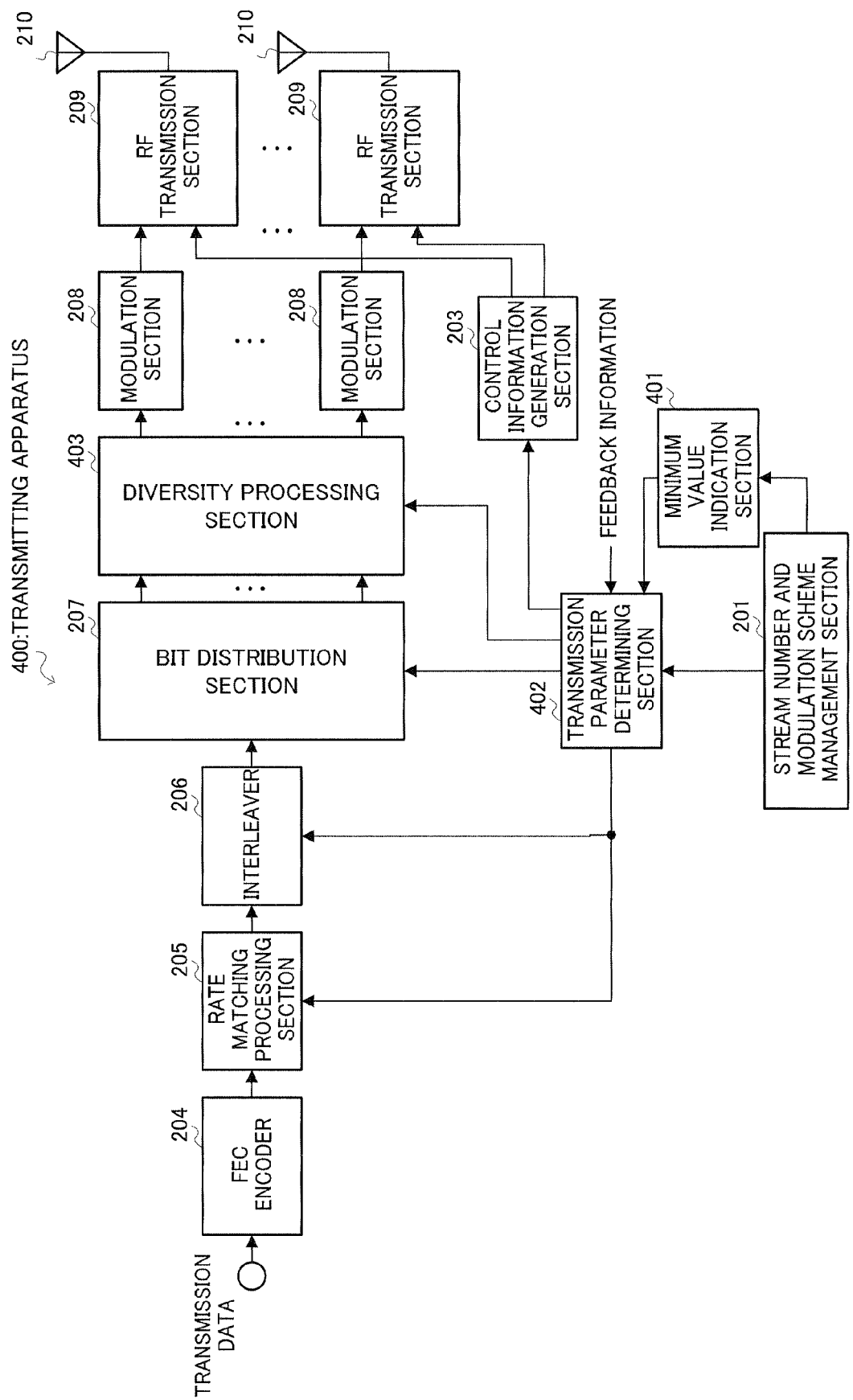
FIG. 5 is a block diagram showing the configuration of a transmitting apparatus according to Embodiment 2 of the present invention.

FIG. 5 is a block diagram showing the configuration of transmitting apparatus 400 according to Embodiment 2 of the present invention. The feedback information transmitted from a receiving apparatus includes diversity application information in addition to modulation information, MIMO multiplexing information and coding information.

In FIG. 5, minimum value indication section 401 indicates to transmission parameter determining section 402 a minimum number of streams and a minimum M-ary number out of the numbers of transmittable streams and modulation schemes managed by stream number and modulation scheme management section 201.

Transmission parameter determining section 402 sets sequence length S of spatially multiplexed symbols and coding rate R using the number of transmittable streams and modulation schemes managed by stream number and modulation scheme management section 201 and capacity C out of the feedback information transmitted from the receiving apparatus.

Furthermore, transmission parameter determining section 402 calculates coding rate R' using the minimum number of streams and the minimum M-ary number indicated by minimum value indication section 401, and, when coding rate R is lower than coding rate R', determines to apply diversity and resets sequence length S of the spatially multiplexed symbol and coding rate R. When the diversity is applied, transmission parameter determining section 402 outputs the diversity application information to diversity processing section 403.

Set or reset coding rate R (coding information) is outputted to rate matching processing section 205 and interleaver 206.

Furthermore, transmission parameter determining section 402 determines modulation schemes M1 to Mn of streams using sequence length S of the spatially multiplexed symbol and stream ratio r out of the feedback information and outputs determined modulation schemes M1 to Mn (modulation scheme information) and MIMO multiplexing information to bit distribution section 207. Moreover, transmission parameter determining section 402 outputs the above modulation scheme information, coding information, MIMO multiplexing information and diversity application information to control information generation section 203.

Upon acquiring diversity application information from transmission parameter determining section 402, diversity processing section 403 applies diversity processing to the bit sequence outputted from bit distribution section 207 and outputs the bit sequence subjected to the diversity processing to modulation section 208. Examples of the diversity processing include antenna selection and application of space-time block coding.

In this way, according to Embodiment 2, when the coding rate calculated using the feedback information transmitted from the receiving apparatus is lower than the coding rate calculated using the minimum number of streams and the minimum M-ary number out of the number of streams that can be transmitted by the transmitting apparatus and modulation schemes, the effect of coding gain is relatively small, and therefore stable communication quality can be secured by applying spatial diversity.

Embodiment 3

Figure 6:
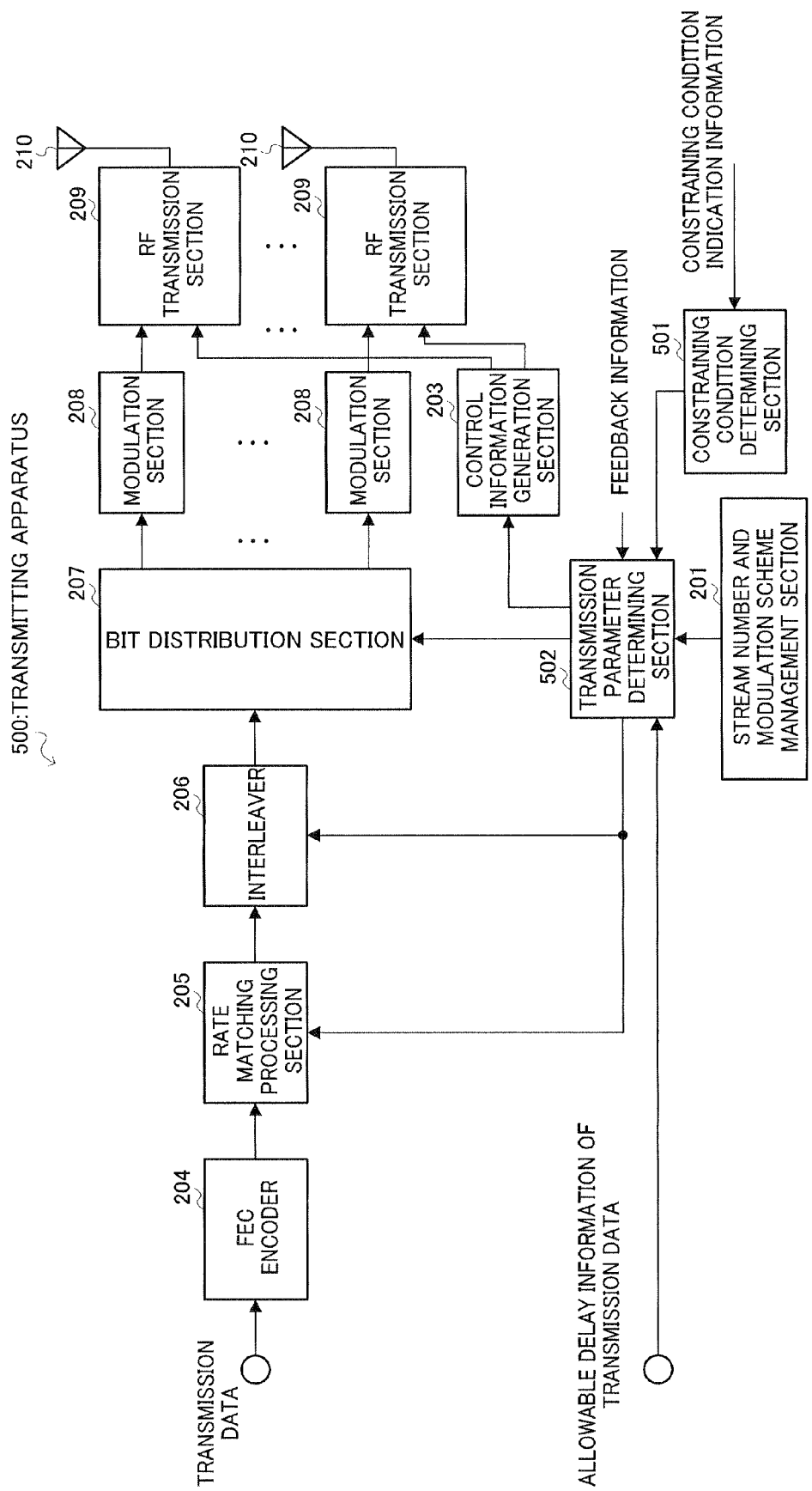
FIG. 6 is a block diagram showing the configuration of a transmitting apparatus according to Embodiments 3 and 4 of the present invention.

FIG. 6 is a block diagram showing the configuration of transmitting apparatus 500 according to Embodiment 3 of the present invention. In this figure, constraining condition determining section 501 determines a constraining condition upon determination of a transmission parameter based on constraining condition indication information transmitted from a receiving apparatus and reports the determined constraining condition to transmission parameter determining section 502. Here, the constraining condition is set so that QPSK is preferentially applied out of a plurality of modulation schemes.

Transmission parameter determining section 502 sets sequence length S of spatially multiplexed symbols and coding rate R (R is approximately ½) based on the number of transmittable streams managed by stream number and modulation scheme management section 201 and the constraining condition reported from constraining condition determining section 501, that is, by applying QPSK preferentially, and based on capacity C out of feedback information.

Furthermore, transmission parameter determining section 502 determines modulation schemes M1 to Mn of the streams based on stream ratio r out of the feedback information, sequence length S of the spatially multiplexed symbol and the constraining condition.

Here, when the transmittable modulation schemes are QPSK and 16QAM, the constraining condition acts so as to preferentially apply QPSK even for a stream with a high stream ratio. In this way, by adopting interference-resistant QPSK as a constraining condition, it is possible to reduce interference from other streams. Furthermore, by adopting error-resistant QPSK as a constraining condition, it is possible to improve the demodulating accuracy. In this way, when a modulation scheme is used as a constraining condition, a modulation scheme with a small M-ary number is preferable.

In this way, according to Embodiment 3, in the case where the constraining condition transmitted from the receiving apparatus is a modulation scheme, and, when the transmitting apparatus determines a coding rate and a modulation scheme based on the feedback information, by preferentially applying a modulation scheme with a smaller M-ary number determined as the constraining condition, it is possible to improve the interference robustness and error robustness.

Embodiment 4

Although a case has been described in Embodiment 3 where a constraining condition is a modulation scheme, a case will be described in Embodiment 4 of the present invention where a constraining condition is the specified number of retransmissions (the number of retransmission times based on an allowable delay for transmission). The configuration of a transmitting apparatus according to Embodiment 4 of the present invention is similar to the configuration shown in FIG. 6 and will be described using FIG. 6.

In FIG. 6, based on the constraining condition indication information transmitted from a receiving apparatus, constraining condition determining section 501 determines the specified number of retransmissions according to the allowable delay for transmission as the constraining condition upon determination of a transmission parameter and reports the determined constraining condition (the specified number of retransmissions) to transmission parameter determining section 502.

Transmission parameter determining section 502 sets sequence length S of spatially multiplexed symbols and coding rate R based on the number of transmittable streams and modulation schemes managed by stream number and modulation scheme management section 201, the constraining condition reported from constraining condition determining section 501, that is, the specified number of retransmissions and capacity C out of the feedback information. It is assumed that coding rate R is a coding rate according to the specified number of retransmissions, and more specifically, a higher coding rate is set when the specified number of retransmissions is smaller, and a lower coding rate is set when the specified number of retransmissions is larger. As the highest coding rate, for example, R=1/3 is set, and, as the lowest coding rate, for example, R=5/6 is set.

Furthermore, transmission parameter determining section 502 determines modulation schemes M1 to Mn of streams based on stream ratio r out of the feedback information and sequence length S of spatially multiplexed symbols.

In this way, according to Embodiment 4, in the case where the constraining condition transmitted from the receiving apparatus is the specified number of retransmissions, and, when the transmitting apparatus determines a coding rate and a modulation scheme based on the feedback information, by setting the coding rate according to the specified number of retransmissions determined as the constraining condition, the communication efficiency can be maximized.

By the way, it is also possible to combine Embodiment 1 which assumes no constraining condition, Embodiment 3 which assumes a modulation scheme as a constraining condition and this embodiment which assumes the specified number of retransmissions as a constraining condition as appropriate and selectively switch constraining conditions. This switching may be performed according to an indication of a constraining condition from the receiving apparatus or according to information that the transmitting apparatus has.

Embodiment 5

Figure 7:
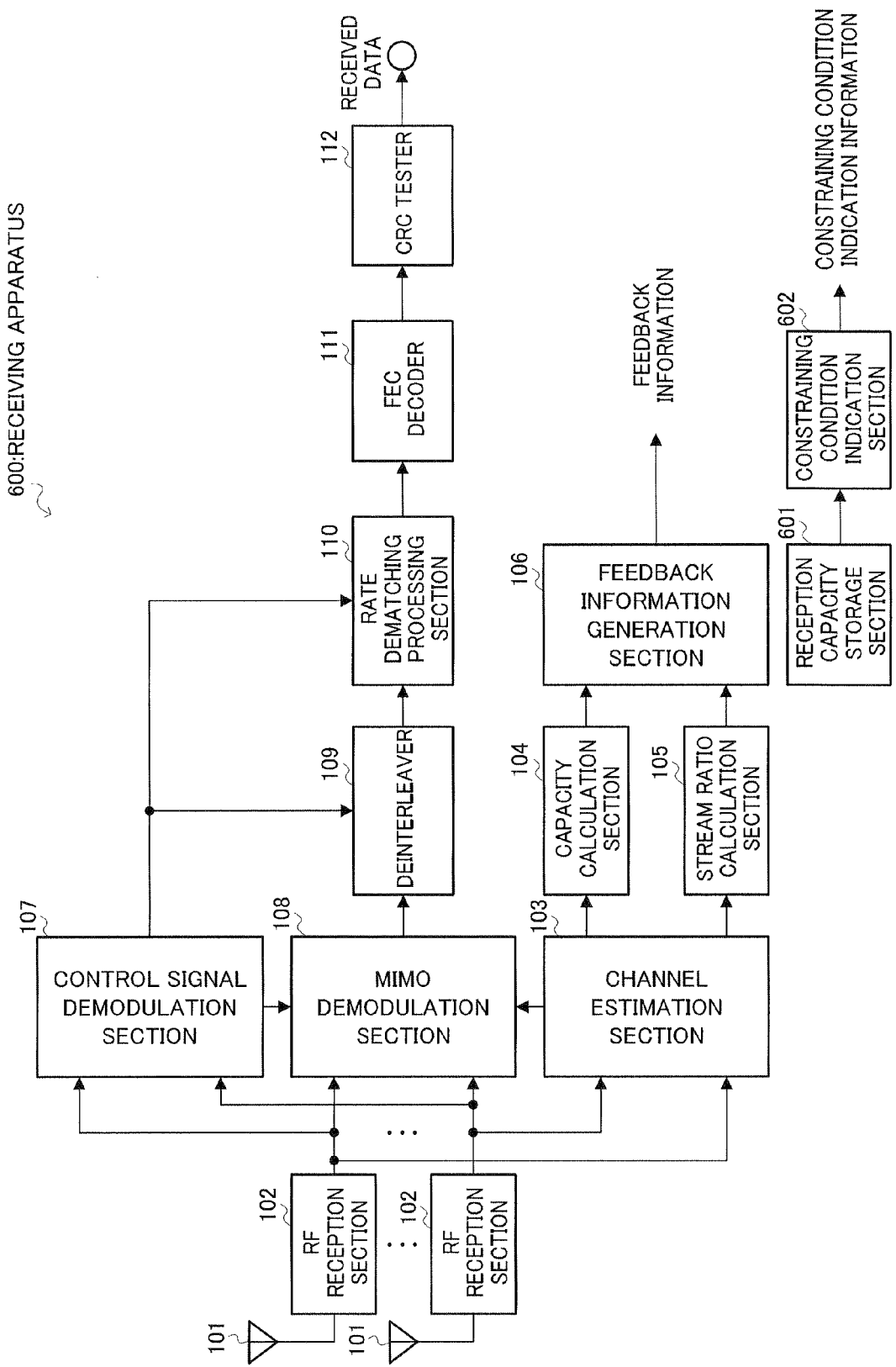
FIG. 7 is a block diagram showing the configuration of a receiving apparatus according to Embodiment 5 of the present invention.

FIG. 7 is a block diagram showing the configuration of receiving apparatus 600 according to Embodiment 5 of the present invention. In this figure, reception capacity storage section 601 stores reception capacities such as modulated symbol demodulating performance and an amount of buffer for combining retransmission data provided for receiving apparatus 600.

Based on the reception capacity of receiving apparatus 600 stored in reception capacity storage section 601, constraining condition indication section 602 determines which of a modulation scheme and the specified number of retransmissions should be set as a constraining condition or no constraining condition should be set, and transmits the determination to the transmitting apparatus as constraining condition indication information.

In this way, according to Embodiment 5, the receiving apparatus indicates a constraining condition based on the reception capacity of the receiving apparatus to the transmitting apparatus, thereby preventing the receiving apparatus from receiving data which requires processing exceeding the reception capacity of the receiving apparatus, so that it is possible to efficiently perform reception processing.

Embodiment 6

Figure 8:
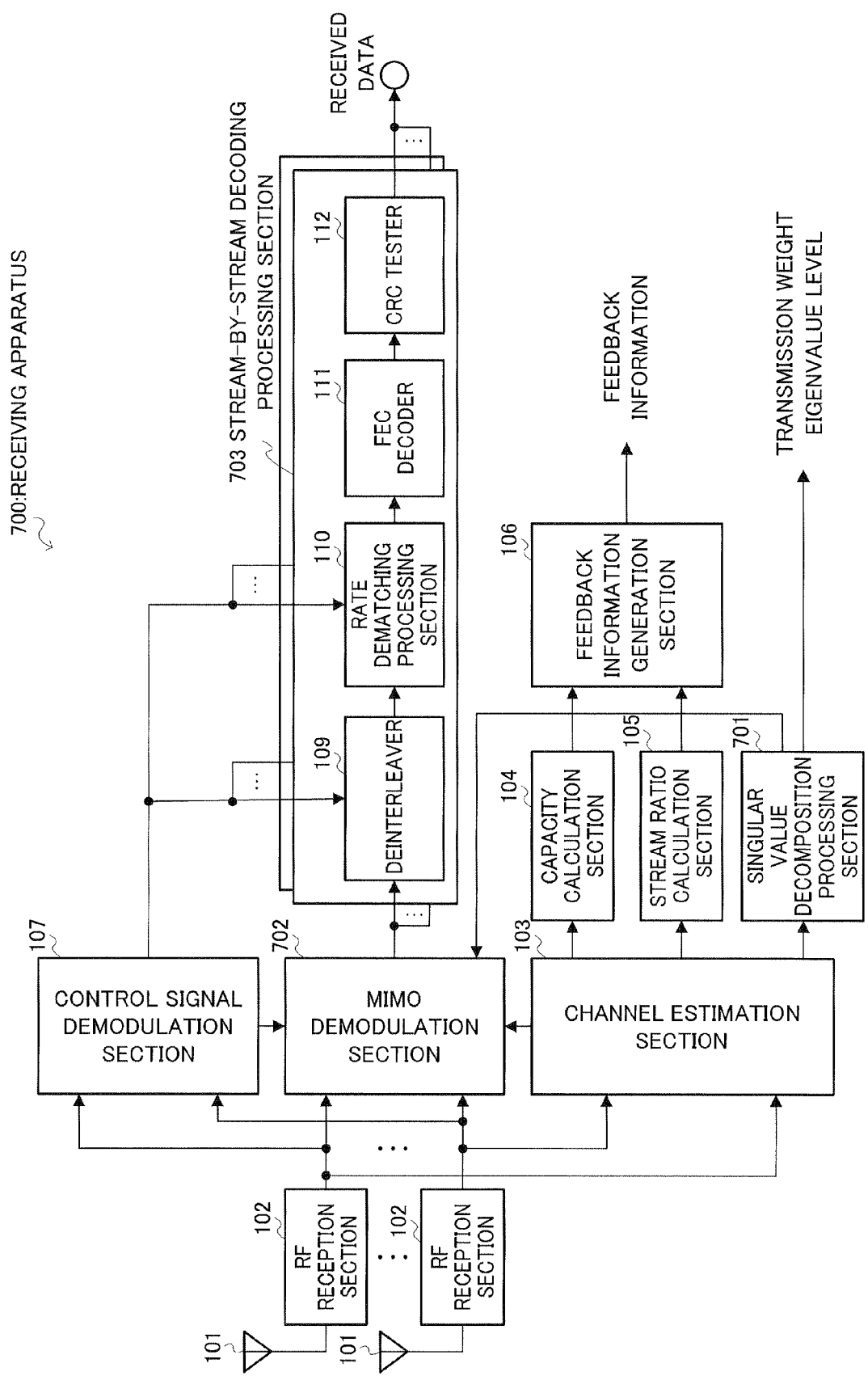
FIG. 8 is a block diagram showing the configuration of a receiving apparatus according to Embodiment 6 of the present invention.

FIG. 8 is a block diagram showing the configuration of receiving apparatus 700 according to Embodiment 6 of the present invention. In this figure, singular value decomposition processing section 701 performs singular value decomposition using a channel matrix (channel estimation values) outputted from channel estimation section 103, and thereby calculates an eigenvalue vector (transmission vector (transmission weight) and reception vector (reception weight)), outputs the reception weight to MIMO demodulation section 702 and transmits the transmission weight and the magnitude of the eigenvalue (eigenvalue level) of the transmission weight to the transmitting apparatus.

MIMO demodulation section 702 performs MIMO demodulation using the reception weight outputted from singular value decomposition processing section 701. The MIMO-demodulated signal is subjected to decoding processing in stream units at stream-by-stream decoding processing section 703. That is, deinterleaving, rate dematching processing, FEC decoding and CRC check are performed, and, as a result, received data is extracted.

Figure 9:
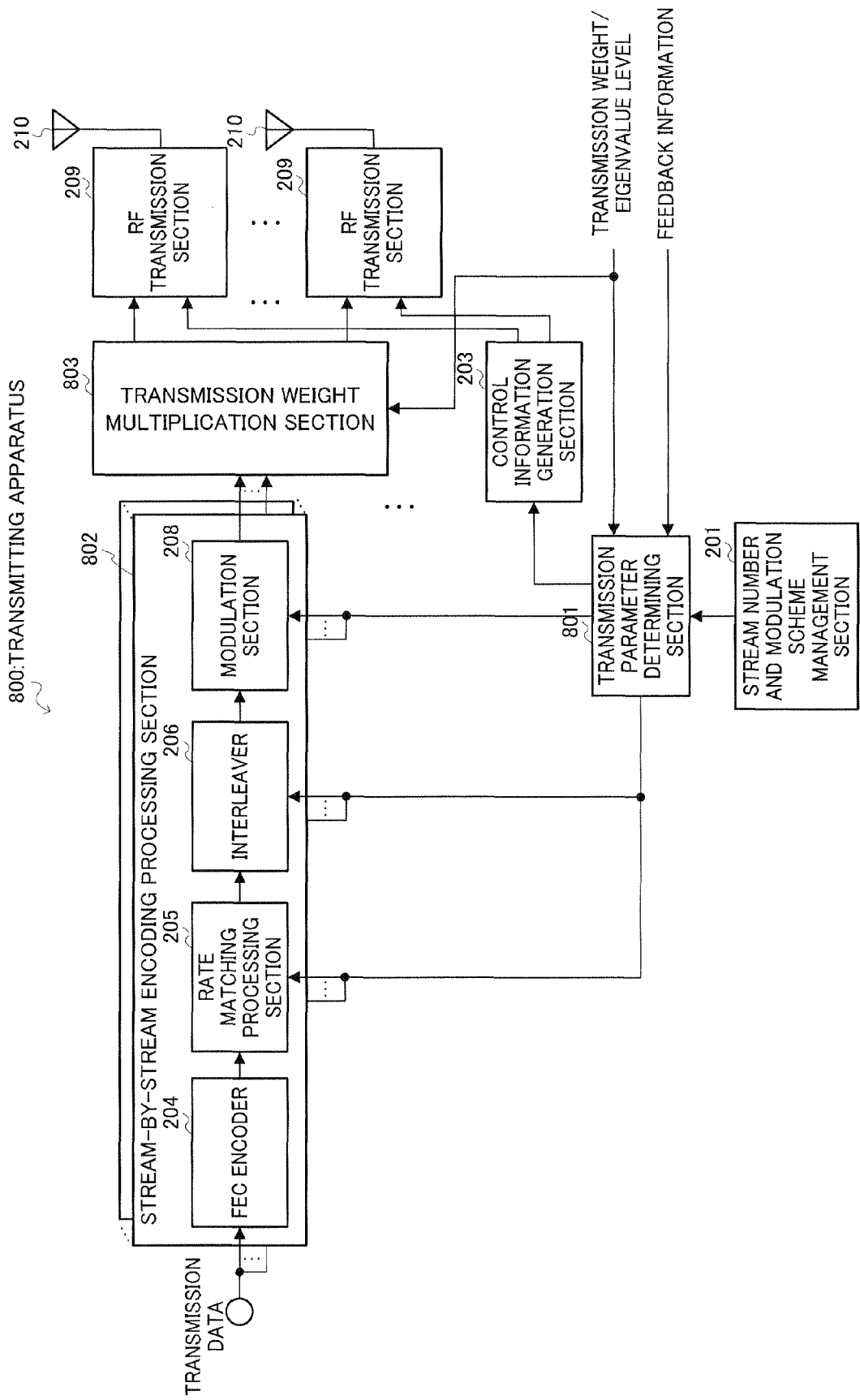
FIG. 9 is a block diagram showing the configuration of a transmitting apparatus according to Embodiment 6 of the present invention.

FIG. 9 is a block diagram showing the configuration of transmitting apparatus 800 according to Embodiment 6 of the present invention. In this figure, transmission parameter determining section 801 determines a transmission parameter using the feedback information, transmission weight and eigenvalue level transmitted from receiving apparatus 700. To be more specific, based on the number of transmittable (eigen mode division multiplexing) streams and modulation schemes managed by stream number and modulation scheme management section 201 and the eigenvalue level (equivalent to capacity C) corresponding to each transmission vector for each stream, transmission parameter determining section 801 sets sequence length S of spatially multiplexed symbols and coding rate R (R is approximately 1/2) for each stream. Set coding rate R (coding information) is outputted to rate matching processing section 205 and interleaver 206 of stream-by-stream encoding processing section 802.

Furthermore, transmission parameter determining section 801 determines modulation schemes M1 to Mn of streams from stream ratio r included in the feedback information and sequence length S of spatially multiplexed symbols and outputs determined modulation schemes M1 to Mn (modulation scheme information) to modulation section 208 of stream-by-stream encoding processing section 802.

Stream-by-stream encoding processing section 802 applies encoding processing to transmission data in stream units. More specifically, stream-by-stream encoding processing section 802 performs encoding and modulation processing on the transmission data in stream units using the coding information and the modulation scheme information outputted from transmission parameter determining section 801 and outputs a modulated signal in stream units to transmission weight multiplication section 803.

Transmission weight multiplication section 803 multiplies the modulated signal outputted from stream-by-stream encoding processing section 802 by the transmission weight transmitted from the receiving apparatus and outputs the modulated signal multiplied by the transmission weight to RF transmission sections 209.

In this way, according to Embodiment 6, the receiving apparatus decomposes a channel matrix into singular values and transmits calculated eigenvalue vectors and eigenvalue levels to the transmitting apparatus, and the transmitting apparatus determines a coding rate and a modulation scheme using the feedback information, eigenvalue vectors and eigenvalue levels transmitted from the receiving apparatus, and thereby it is possible to secure a coding gain according to the communication quality in eigen mode transmission.

Each of the above-described embodiments has been described using ratios of reception quality of streams as feedback information. However, the present invention is not limited to this, and ranks of reception quality of the streams may also be used as feedback information.

Furthermore, the receiving apparatus described in each of the above-described embodiments may also be applied to a wireless communication mobile station apparatus, and the transmitting apparatus may also be applied to a wireless communication base station apparatus.

Furthermore, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI" "super LSI", or "ultra LSI" depending on differing extents of integration.

Furthermore, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Moreover, if integrated circuit technology comes out to replace LSI's as a result of the advancement of semiconductor technology or a derivative other technology, it is naturally also possible to carry out function block integration using this technology. Application of biotechnology is also possible.

According to a first aspect of the present invention, a transmitting apparatus adopts a configuration including: a management section that manages a number of transmittable streams and modulation schemes; a reception section that receives feedback information indicating a communication capacity of a channel, ratios or ranks of reception quality of the streams; and a transmission parameter determining section that determines a sequence length of spatially multiplexed symbols and a coding rate based on the communication capacity of the channel received by the reception section, the number of transmittable streams and modulation schemes managed by the management section and determines the modulation schemes of the streams based on the sequence length of the spatially multiplexed symbol and the ratios or ranks of the reception quality of the streams. Here, the "sequence length of the spatially multiplexed symbol" refers to the number of bits in a symbol spatially multiplexed and transmitted in a MIMO configuration.

According to this configuration, by adopting the capacity and stream ratio as feedback information, it is possible to reduce the amount of feedback information.

According to a second aspect of the present invention, the transmitting apparatus in the above described configuration, further includes a diversity processing section that performs diversity processing, and in the transmitting apparatus, when the coding rate calculated based on the communication capacity of the channel received by the reception section and the number of transmittable streams and modulation schemes managed by the management section is lower than a predetermined threshold, the transmission parameter determining section applies diversity processing and recalculates a coding rate.

According to this configuration, when the calculated coding rate is lower than the predetermined threshold, it is possible to secure stable communication quality by applying spatial diversity.

According to a third aspect of the present invention, in the transmitting apparatus in the above described configuration, the transmission parameter determining section determines the coding rate and the modulation schemes of the streams based on the feedback information under a constraining condition of preferentially applying a predetermined modulation scheme.

According to this configuration, if a predetermined modulation scheme is a modulation scheme having a small M-ary number, for example, QPSK, the interference robustness and the error robustness can be improved by preferentially applying this modulation scheme.

According to a fourth aspect of the present invention, in the transmitting apparatus in the above described configuration, the transmission parameter determining section uses a specified number of retransmissions, which is a number of retransmittable times based on an allowable delay for transmission as the constraining condition and determines a coding rate according to the specified number of retransmissions.

According to this configuration, the communication efficiency can be maximized by setting a coding rate according to the specified number of retransmissions, for example, a higher coding rate is set when the specified number of retransmissions is smaller, and a lower coding rate is set when the specified number of retransmissions is larger.

According to a fifth aspect of the present invention, the transmitting apparatus in the above described configuration, further includes a constraining condition determining section that, when determining the coding rate and the modulation schemes of the streams in the transmission parameter determining section, determines whether or not to provide the constraining condition, and, when the constraining condition is provided, determines whether preferential application of a predetermined modulation scheme is used as the constraining condition or the specified number of retransmissions is used as the constraining condition.

According to this configuration, data which requires processing within a range of the reception capacity of a communicating party is transmitted, so that the communicating party can efficiently perform reception processing.

According to a sixth aspect of the present invention, in the transmitting apparatus in the above described configuration, the transmission parameter determining section determines the sequence length of the spatially multiplexed symbol and the coding rate based on transmission vectors for eigen mode transmission and an eigenvalue level indicating the magnitude of the transmission vector and the number of transmittable streams and modulation schemes managed by the management section and determines the modulation schemes of the streams based on the sequence length of the spatially multiplexed symbol and the acquired ratios or ranks of the reception quality of the streams.

According to this configuration, a coding rate and the modulation schemes of streams are determined using a transmission vector and an eigenvalue level for eigen mode transmission transmitted from the communicating party, so that it is possible to secure a coding gain according to communication quality in eigen mode transmission.

According to a seventh aspect of the present invention, a radio communication base station apparatus adopts a configuration including a transmitting apparatus described in any of the above aspects.

According to this configuration, by adopting a capacity and stream ratio as feedback information, it is possible to reduce the amount of feedback information.

According to an eighth aspect of the present invention, a receiving apparatus adopts a configuration including a channel estimation section that performs channel estimation using a common reference signal; a communication capacity calculation section that calculates a communication capacity of the channel using a channel estimation value estimated by the channel estimation section; a stream ratio calculation section that calculates ratios or ranks of reception quality of streams using the channel estimation value estimated by the channel estimation section; and a feedback section that feeds back the communication capacity calculated by the communication capacity calculation section and the ratios or ranks of the reception quality of the streams calculated by the stream ratio calculation section as feedback information.

According to this configuration, by adopting a capacity and stream ratio as feedback information, it is possible to reduce the amount of feedback information.

According to a ninth aspect of the present invention, the receiving apparatus in the above described configuration, further includes a decision section that decides whether or not to provide a constraining condition for determining a coding rate and determines, when the constraining condition is provided, whether preferential application of the predetermined modulation scheme is used as the constraining condition or a specified number of retransmissions which is the number of retransmissionable times is used as the constraining condition according to an allowable delay time for transmission.

According to this configuration, it is possible to prevent the receiving apparatus from receiving data which requires processing exceeding a range of the reception capacity of the receiving apparatus and efficiently perform reception processing.

According to a tenth aspect of the present invention, the receiving apparatus in the above described configuration, further includes a singular value decomposition processing section that, by decomposing the channel estimation value estimated by the channel estimation section into singular values, calculates an eigenvalue vector for eigen mode transmission and an eigenvalue level indicating a magnitude of the eigen vector and transmits the calculated eigen vectors and eigenvalue level.

According to this configuration, by transmitting the eigen vector and the eigenvalue level for eigen mode transmission to the communicating party, the communicating party can determine the coding rate and the modulation schemes of the streams using the transmission vector and the eigenvalue level for eigen mode transmission, so that it is possible to secure a coding gain according to the communication quality in the eigen mode transmission.

According to an eleventh aspect of the present invention, a radio communication mobile station apparatus adopts a configuration including a receiving apparatus described any of the above aspects.

According to this configuration, by adopting a capacity and stream ratio as feedback information, it is possible to reduce the amount of feedback information.

According to a twelfth aspect of the present invention, a link adaptation method includes steps of: acquiring feedback information indicating a communication capacity of a channel and ratios or ranks of reception quality of streams; determining a sequence length of spatially multiplexed symbols and a coding rate based on the acquired communication capacity of the channel, a number of transmittable streams and modulation schemes; and determining the modulation schemes of the streams based on the sequence length of the spatially multiplexed symbol and the acquired ratios or ranks of the reception quality of the streams.

According to this method, by adopting a capacity and stream ratio as feedback information, it is possible to reduce the amount of feedback information.

According to a thirteenth aspect of the present invention, a radio communication system adopts a configuration including: a transmitting apparatus that comprises: a management section that manages a number of transmittable streams and modulation schemes; a transmission parameter determining section that determines a sequence length of spatially multiplexed symbols and a coding rate based on a communication capacity of a channel, the number of transmittable streams and modulation schemes managed by the management section and determines the modulation schemes of the streams based on the sequence length of the spatially multiplexed symbol, ratios or ranks of reception quality of the streams; and a transmission section that transmits data processed using the coding rate and modulation scheme determined by the transmission parameter determining section; and a receiving apparatus that comprises: a feedback section that feeds back the communication capacity of the channel and the ratios or ranks of the reception quality of the streams to the transmitting apparatus as feedback information; and a reception section that receives the data transmitted from the transmitting apparatus.

According to this configuration, by adopting a capacity and stream ratio as feedback information, it is possible to reduce the amount of feedback information.

The present application is based on Japanese Patent Application No. 2005-127719, filed on Apr. 26, 2005, the entire content of which is expressly incorporated by reference herein.

INDUSTRIAL APPLICABILITY

The transmitting apparatus, receiving apparatus and link adaptation method according to the present invention have an advantage of reducing the amount of feedback information and are suitable for use in a MIMO transmitting apparatus, MIMO receiving apparatus, or the like.

The invention claimed is:

1. A transmitting apparatus comprising:
a management section that manages a number of transmittable streams and modulation schemes;
a reception section that receives feedback information indicating a communication capacity of a channel, ratios or ranks of reception quality of the streams; and
a transmission parameter determining section that determines a sequence length of spatially multiplexed symbols and a coding rate based on the communication capacity of the channel received by the reception section, the number of transmittable streams and modulation schemes managed by the management section and determines the modulation schemes of the streams based on the sequence length of the spatially multiplexed symbol and the ratios or ranks of the reception quality of the streams.

2. The transmitting apparatus according to claim 1, further comprising a diversity processing section that performs diversity processing,
wherein, when the coding rate calculated based on the communication capacity of the channel received by the reception section and the number of transmittable streams and modulation schemes managed by the management section is lower than a predetermined threshold, the transmission parameter determining section applies diversity processing and recalculates a coding rate.

3. The transmitting apparatus according to claim 1, wherein the transmission parameter determining section determines the coding rate and the modulation schemes of the streams based on the feedback information under a constraining condition of preferentially applying a predetermined modulation scheme.

4. The transmitting apparatus according to claim 1, wherein the transmission parameter determining section uses a specified number of retransmissions, which is a number of retransmittable times based on an allowable delay time for transmission, as the constraining condition and determines a coding rate according to the specified number of retransmissions.

5. The transmitting apparatus according to claim 1, further comprising a constraining condition determining section that, when determining the coding rate and the modulation schemes of the streams in the transmission parameter determining section, determines whether or not to provide the constraining condition, and, when the constraining condition is provided, determines whether preferential application of a predetermined modulation scheme is used as the constraining condition or the specified number of retransmissions is used as the constraining condition.

6. The transmitting apparatus according to claim 1, wherein the transmission parameter determining section determines the sequence length of the spatially multiplexed symbol and the coding rate based on transmission vectors for eigen mode transmission and an eigenvalue level indicating the magnitude of the transmission vector and the number of transmittable streams and modulation schemes managed by the management section and determines the modulation schemes of the streams based on the sequence length of the spatially multiplexed symbol and the acquired ratios or ranks of the reception quality of the streams.

7. A radio communication base station apparatus comprising the transmitting apparatus according to claim 1.

8. A link adaptation method comprising the steps of:
acquiring feedback information indicating a communication capacity of a channel and ratios or ranks of reception quality of streams;
determining a sequence length of spatially multiplexed symbols and a coding rate based on the acquired communication capacity of the channel, a number of transmittable streams and modulation schemes; and
determining the modulation schemes of the streams based on the sequence length of the spatially multiplexed symbol and the acquired ratios or ranks of the reception quality of the streams.

9. A radio communication system comprising:
a transmitting apparatus that comprises:
a management section that manages a number of transmittable streams and modulation schemes;
a transmission parameter determining section that determines a sequence length of spatially multiplexed symbols and a coding rate based on a communication capacity of a channel, the number of transmittable streams and modulation schemes managed by the management section and determines the modulation schemes of the streams based on the sequence length of the spatially multiplexed symbol, ratios or ranks of reception quality of the streams; and
a transmission section that transmits data processed using the coding rate and modulation scheme determined by the transmission parameter determining section; and
a receiving apparatus that comprises:
a feedback section that feeds back the communication capacity of the channel and the ratios or ranks of the reception quality of the streams to the transmitting apparatus as feedback information; and
a reception section that receives the data transmitted from the transmitting apparatus.

* * * * *